(12) United States Patent
Kim et al.

(10) Patent No.: US 9,544,901 B2
(45) Date of Patent: *Jan. 10, 2017

(54) METHOD AND APPARATUS FOR RECEIVING AVAILABLE CHANNEL INFORMATION IN A WIRELESS LAN SYSTEM

(75) Inventors: Eun Sun Kim, Gyeonggi-do (KR); Byoung Hoon Kim, Gyeonggi-do (KR); Yong Ho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 486 days.

This patent is subject to a terminal disclaimer.

(21) Appl. No.: 13/637,508

(22) PCT Filed: Mar. 31, 2011

(86) PCT No.: PCT/KR2011/002241
§ 371 (c)(1),
(2), (4) Date: Dec. 6, 2012

(87) PCT Pub. No.: WO2011/122885
PCT Pub. Date: Oct. 6, 2011

(65) Prior Publication Data
US 2013/0142132 A1    Jun. 6, 2013

Related U.S. Application Data

(60) Provisional application No. 61/319,267, filed on Mar. 31, 2010, provisional application No. 61/319,883, (Continued)

(51) Int. Cl.
*H04W 4/00* (2009.01)
*H04W 72/04* (2009.01)
(Continued)

(52) U.S. Cl.
CPC ....... *H04W 72/0473* (2013.01); *H04W 52/367* (2013.01); *H04W 16/14* (2013.01); *H04W 84/12* (2013.01)

(58) Field of Classification Search
CPC ...................................................... H04W 16/14
(Continued)

(56) References Cited

U.S. PATENT DOCUMENTS 6,987,738 B2 * 1/2006 Subramanian et al. ...... 370/252
8,880,086 B2 * 11/2014 Lee ....................... H04W 16/14
455/452.1

(Continued)

OTHER PUBLICATIONS

Search Report and Written Opinion issued in International Application No. PCT/KR2011/001883 dated Nov. 23, 2011.
(Continued)

*Primary Examiner* — Shaq Taha
(74) *Attorney, Agent, or Firm* — Morgan, Lewis & Bockius LLP (57) ABSTRACT

The present invention relates to a method and apparatus for receiving available channel information in a wireless LAN system. According to one aspect of the present invention, in a method in which a first station (STA) receives available channel information in a wireless LAN system, wherein the first station operates as an unlicensed device that is allowed to operate in an available channel not used by a licensed device in a white space band, the first station receives, from a second station, a frame including an operating class field, a channel number field and a maximum transmission power field, and operates in the channel indicated by the operating class field and the channel number field, wherein said operating class field and said channel number field indicate the available channel which can be used by the unlicensed device, and said maximum transmission power field indi-
(Continued)

These three fields are repeated, as determined by the Length field

| Element ID | Length | Country String | First Channel Number /Regulatory Extension Identifier | Number of Channels /Regulatory Class | Maximum Transmit Power Level /Coverage Class | Pad (if needed) |
|---|---|---|---|---|---|---|
| Octets: 1 | 1 | 3 | 1 | 1 | 1 | 0 or 1 | cates the maximum transmission power permitted in the available channel.

6 Claims, 10 Drawing Sheets

Related U.S. Application Data filed on Apr. 1, 2010, provisional application No. 61/321,506, filed on Apr. 7, 2010.

(51) Int. Cl.
*H04W 52/36* (2009.01)
*H04W 84/12* (2009.01)
*H04W 16/14* (2009.01)

(58) Field of Classification Search
USPC .............................................. 455/509, 180.2
See application file for complete search history.

(56) References Cited

U.S. PATENT DOCUMENTS

| 9,204,311 | B1* | 12/2015 | Banerjea ............... H04W 16/14 |
| 2008/0014934 | A1* | 1/2008 | Balasubramanian et al. .............................. 455/434 |
| 2008/0259882 | A1* | 10/2008 | Abdel-Kader et al. ....... 370/338 |
| 2010/0048234 | A1* | 2/2010 | Singh ............................ 455/509 |

OTHER PUBLICATIONS

LG Electronics, "Amendment Proposal for TV White Spaces Operation," IEEE 802.11, TGaf, IEEE 802.11-10/0263rl, Mar. 18, 2010.

Nict, "Enabling Procedure of Communication in TVWS under FCC rules," IEEE 802.11, TGaf, IEEE 802.11-10/0261/1 dated Feb. 28, 2009.

ECMA International, "MAC and PHY for Operation in TV White Space," Final Draft Standard ECMA-XXX, 1st Edition, Ecma/TC4812009/061 dated Oct. 2009.

* cited by examiner

| Element ID | Length | Country String | First Channel Number /Regulatory Extension Identifier | Number of Channels /Regulatory Class | Maximum Transmit Power Level /Coverage Class | Pad (if needed) |
|---|---|---|---|---|---|---|
| 1 | 1 | 3 | 1 | 1 | 1 | 0 or 1 |

These three fields are repeated, as determined by the Length field

Octets :

FIG. 6

| Element ID | Length | Capabilities |
|---|---|---|

Octets :      1      1      n

FIG. 7

| Element ID | Length | Channel Power Management Mode | Channel Power Switch Count (Optional) | Operating Class | Channel Number | Constrained Maximum Transmit Power (Optional) |
|---|---|---|---|---|---|---|
| 1 | 1 | 1 | 1 | 1 | 1 | 1 |

These three fields are repeated, as determined by the Length field

Octets :

FIG. 8

| Element ID | Length | Operating Class | Channel List |
|---|---|---|---|
| 1 | 1 | 1 | Variable |

Octets :

FIG. 9

| Channel 1 | Local Power Constraint 1 | Channel 2 | Local Power Constraint 2 | ...... | Channel n | Local Power constraint n |
|---|---|---|---|---|---|---|
| 1 | 1 | 1 | 1 | | 1 | 1 |

FIG. 10

METHOD AND APPARATUS FOR RECEIVING AVAILABLE CHANNEL INFORMATION IN A WIRELESS LAN SYSTEM

TECHNICAL FIELD

The present invention relates to a wireless LAN system and more particularly to a method and apparatus for receiving multi-band information in a wireless LAN system.

BACKGROUND ART

A standard of a wireless local area network (WLAN) technology is being developed as a standard of Institute of Electrical and Electronics Engineers (IEEE) 802.11. IEEE 802.11a and IEEE 802.11b use an unlicensed band at 2.4 GHz or 5 GHz and IEEE 802.11b provides a transfer rate of 11 Mbps and IEEE 802.11a provides a transfer rate of 54 Mbps. IEEE 802.11g applies Orthogonal Frequency Division Multiplexing (OFDM) at 2.4 GHz to provide a transfer rate of 54 Mbps. IEEE 802.11n applies multiple input multiple output-OFDM (MIMO-OFDM) to provide a transfer rate of 300 Mbps for 4 spatial streams. IEEE 802.11n supports a channel bandwidth of up to 40 MHz. In this case, IEEE 802.11n provides a transfer rate of 600 Mbps.

An IEEE 802.11af standard for defining operation of an unlicensed device in a TV whitespace (TVWS) band is currently being developed.

The TVWS band, which is a frequency band allocated to a broadcast TV, includes an Ultra High Frequency (UHF) band and a Very High Frequency (VHF) band. Specifically, the TVWS band is a frequency band which is allowed to be used by an unlicensed device under a condition that this does not hinder communication of a licensed device that operates in the frequency band. The licensed device may include a TV or a wireless microphone. The licensed device may be referred to as an incumbent user or a primary user. To overcome the problem of coexistence of unlicensed devices, a signaling protocol such as a common beacon frame, a frequency mechanism, or the like may be required for the unlicensed devices.

Operations of all unlicensed devices are permitted in a band of 512-608 MHz and a band of 614-698 MHz. However, only communication between fixed devices is permitted in bands of 54-60 MHz, 76-88 MHz, 174-216 MHz, and 470-512 MHz. The term "fixed device" refers to a device that performs signal transmission only at a fixed location. An IEEE 802.11 TVWS terminal is an unlicensed device that operates, in the TVWS spectrum, using an IEEE 802.11 media access control (MAC) layer and a physical (PHY) layer.

An unlicensed device that desires to use the TVWS band should provide a function to protect licensed devices. Accordingly, the unlicensed device should check whether or not a licensed device occupies the band before the unlicensed device starts signal transmission.

To accomplish this, the unlicensed device may check whether or not the band is being used by a licensed device by performing spectrum sensing. Examples of the spectrum sensing mechanism include an energy detection scheme and a feature detection scheme. The unlicensed device may determine that a licensed device is using a specific band when the intensity of a received signal is greater than a specific level or when a DTV preamble is detected. Upon determining that a licensed device is operating in a channel that is immediately adjacent to a channel currently used by the unlicensed device, the unlicensed device should reduce transmission power.

In the spectrum sensing mechanism, power consumption of a station (STA) is relatively high since the sensing duration is a relatively long period greater than 10 ms. Particularly, the sensing duration is proportional to the possibility of detection of a licensed device signal and therefore the possibility of detection of a licensed device signal increases as the sensing duration increases. Accordingly, there is a need to provide an efficient scanning mechanism that can reduce power consumption of the STA.

DISCLOSURE

Technical Problem

There is a problem in that power consumption is increased if an STA which operates as an unlicensed device in the TVWS depends only on frequency sensing to acquire available channel information as described above.

It is an object of the present invention to provide a method for receiving available channel information, which allows an STA which operates as an unlicensed device in the TVWS to efficiently acquire available channel information.

Objects of the present invention are not limited to those described above and other objects will be clearly understood by a person having ordinary knowledge in the art from the following description.

Technical Solution

In a method for receiving available channel information by a first station (STA) that operates as an unlicensed device that is allowed to operate in an available channel that is not being used by a licensed device in a whitespace band in a wireless LAN system according to an aspect of the present invention to achieve the above objects, the first station receives a frame including an operating class field, a channel number field, and a maximum transmit power field from a second station and operates in a channel indicated by the operating class field and the channel number field, wherein the operating class field and the channel number field indicate an available channel that can be used by an unlicensed device and the maximum transmit power field indicates a maximum transmit power that is permitted in the available channel.

Here, a channel indicated by the operating class field and the channel number field may be a wireless LAN channel.

The frame may include a plurality of sets, each including the operating class field, the channel number field, and the maximum transmit power field.

The frame may further include a length field indicating information regarding a length of the frame and the number of the sets included in the frame may be determined according to a value of the length field.

The first station may scan only a channel indicated by the operating class field and the channel number field.

The first station may receive an information element including a bit indicating that the frame includes available channel information from the second station.

The information element may be an extended capabilities information element.

The second station may be an enabling station.

The second station may be an access point (AP).

A first station (STA) that operates as an unlicensed device that is allowed to operate in an available channel that is not being used by a licensed device in a whitespace band in a wireless LAN system according to another aspect of the present invention to achieve the above objects includes a reception module for receiving a frame including an operating class field, a channel number field, and a maximum transmit power field from a second station and a processor for operating in a channel indicated by the operating class field and the channel number field, wherein the operating class field and the channel number field indicate an available channel that can be used by an unlicensed device and the maximum transmit power field indicates a maximum transmit power that is permitted in the available channel.

Advantageous Effects

According to embodiments of the present invention, the station (STA) can efficiently acquire information regarding available channels.

Advantages of the present invention are not limited to those described above and other advantages will be clearly understood by a person having ordinary knowledge in the art from the following description.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or shown in block diagram form, focusing on important features of the structures and devices, so as not to obscure the concept of the present invention. The same reference numbers will be used throughout this specification to refer to the same or like parts.

First, a general configuration of a wireless LAN system is described below with reference to FIGS. 1 and 2.

Figure 1:
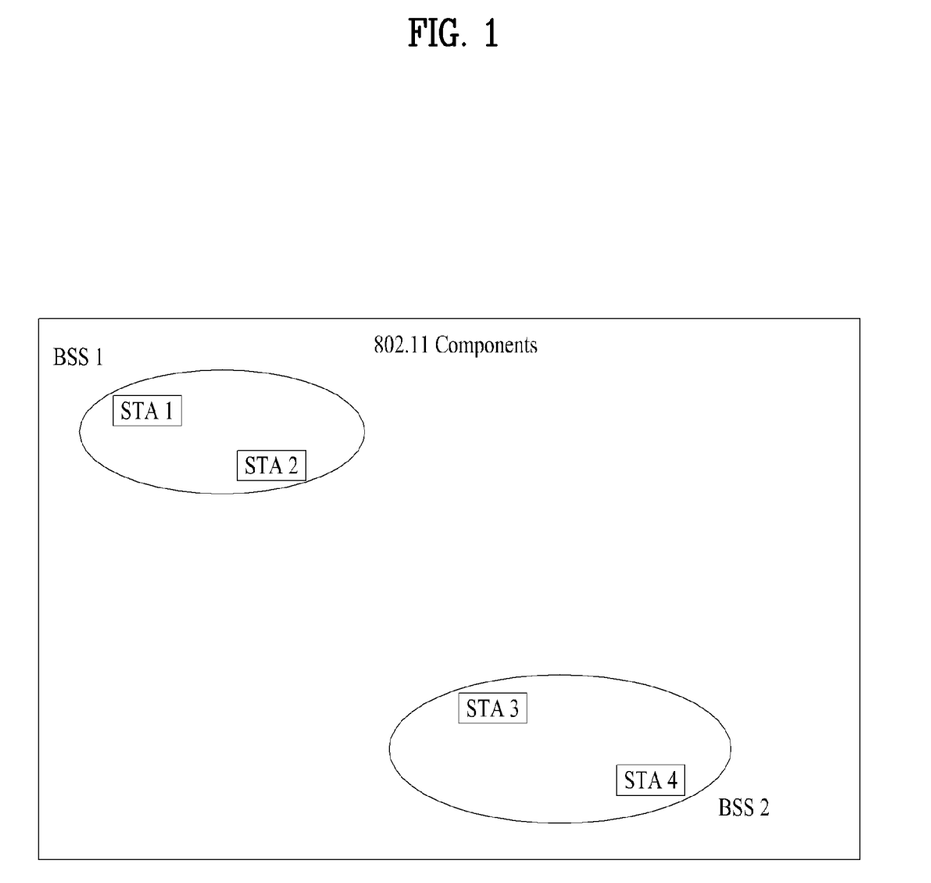
FIG. 1 illustrates an exemplary configuration of a wireless LAN system.

FIG. 1 illustrates an exemplary configuration of a wireless LAN system.

As shown in FIG. 1, the wireless LAN system includes one or more Basic Service Sets (BSSs). A BSS is a set of Stations (STAs) which can communicate with each other after successfully achieving synchronization.

The STA is a logical entity that includes an interface for a physical layer of a wireless medium and a Medium Access Control (MAC) layer. STAs include access point (AP) and non-AP stations. Among STAs, a mobile terminal that is operated by a user may be a non-AP STA. When the term "STA" is stated, it may refer to a non-AP STA. The non-AP STA may also be referred to as another term such as a terminal, a Wireless Transmit/Receive Unit (WTRU), a User Equipment (UE), a Mobile Station (MS), a mobile terminal, or a mobile subscriber unit.

The AP is an entity that provides an associated station (STA), which is coupled to the AP, with a connection to a Distribution System (DS) through a wireless medium. The AP may also be referred to as a concentrated controller, a Base Station (BS), a Node-B, a Base Transceiver System (BTS), or a site controller.

The BSS may be classified into an infrastructure BSS and an independent BSS (IBSS).

Each BSS shown in FIG. 1 is an IBSS. The IBSS is a BSS that does not include an AP. Since the IBSS does not include an AP, the IBSS is not allowed to connect to a DS and thus forms a self-contained network.

Figure 2:
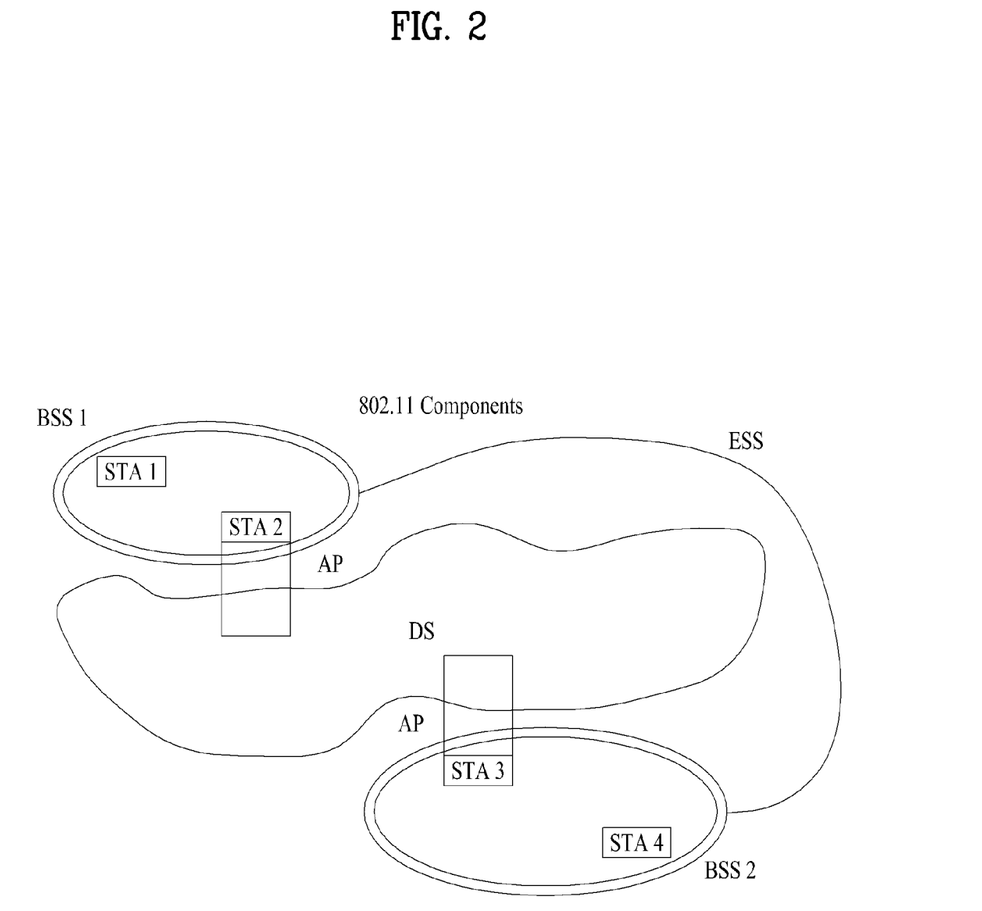
FIG. 2 illustrates another exemplary configuration of the wireless LAN system.

FIG. 2 illustrates another exemplary configuration of the wireless LAN system.

Each BSS shown in FIG. 2 is an infrastructure BSS. The infrastructure BSS includes one or more STAs and an AP. In the infrastructure BSS, in principle, communication between non-AP STAs is performed via an AP. However, when a direct link has been established between non-AP STAs, direction communication can be performed between the non-AP STAs.

As shown in FIG. 2, a plurality of infrastructure BSSs can be connected to each other through a DS. A plurality of BSSs connected through a DS is referred to as an Extended Service Set (ESS). STAs included in the ESs can communicate with each other. In the same ESS, a non-AP STA can move from one BSS to another BSS while performing seamless communication.

The DS is a mechanism which connects a plurality of APs. The DS is not necessarily a network and there is no limitation to the form of the DS provided that the DS can provide a specific distribution service. For example, the DS may be a wireless network such as a mesh network and may also be a physical structure that connects APs to each other.

A spectrum which is not used by licensed devices is referred to as a whitespace. The whitespace spectrum can be used by unlicensed devices. To allow an STA to operate in the whitespace spectrum, first, there is a need to provide a protection scheme for licensed devices (or incumbent users). A channel, which can be used by an unlicensed device since the channel is not used by any licensed device, is referred to as an available channel. The most basic methods for an STA or AP to determine availability of a TV channel include a spectrum sensing method and a method of connecting to a database (DB) to acquire a TV channel. Information of the DB includes information regarding, for example, a schedule for use of a specific channel by a licensed device at a specific location. Accordingly, when an STA or AP desires to determine availability of a TV channel, the STA or AP needs to connect to the DB through the Internet to acquire DB information based on location information of the STA or AP.

To connect to a network, the STA needs to search for any network in which the STA can participate. The STA needs to identify a compatible wireless network before participating in the network. A procedure for identifying a network present in a specific region is referred to as scanning.

Such scanning is classified into active scanning and passive scanning.

Figure 3:
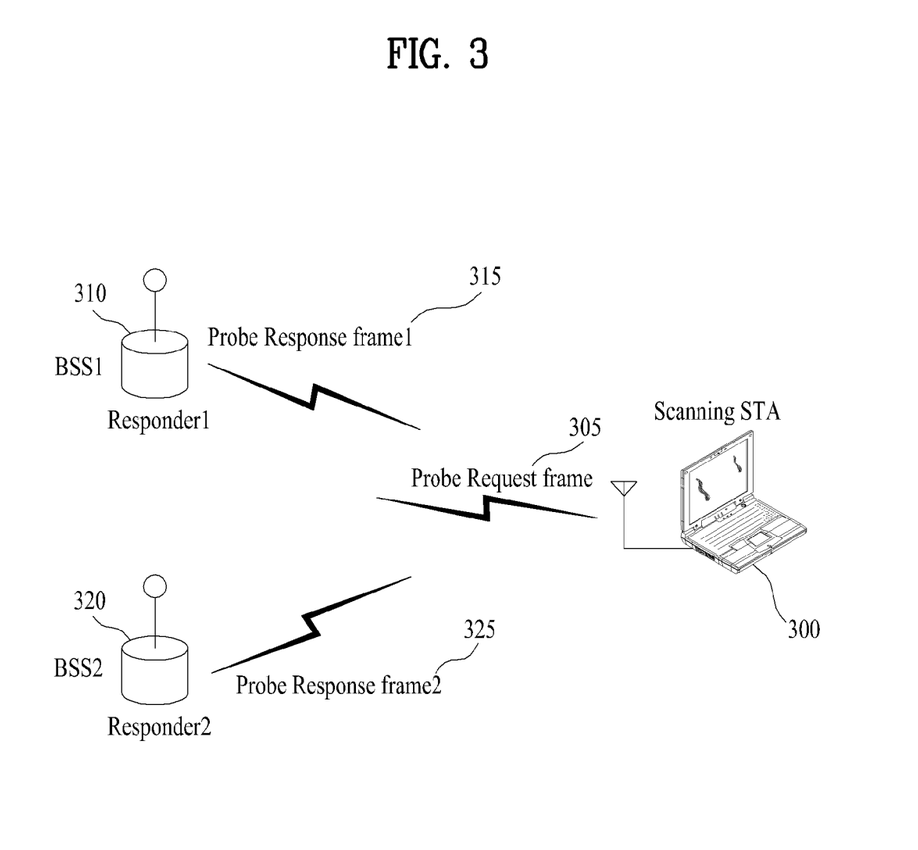
FIG. 3 schematically illustrates active scanning.

FIG. 3 schematically illustrates active scanning.

When an STA performs scanning using the active scanning scheme, the STA transmits a probe request frame in order to search for an AP around the STA while switching between channels and then awaits a response to the probe request frame. The responder transmits a probe response frame to the STA in response to the probe request frame transmitted from the STA. Here, the responder is an STA which has last transmitted a beacon frame in a BSS of a channel which is being scanned. In the infrastructure BSS, an AP serves as the responder since the AP transmits a beacon frame and, in the IBSS, the responder is not fixed since STAs in the IBSS take turns transmitting a beacon frame.

Referring to FIG. 3, when a scanning STA 300 transmits a probe request frame 305, responder 1 (310) of BSS1 and responder 2 (320) of BSS2, which have received the probe request frame, transmit probe response frame 1 (315) and probe response frame 2 (325) to the scanning STA 300. Upon receiving the probe response frame, the scanning STA 300 stores BSS related information included in the received probe response frame and shifts to a next channel and performs scanning of the next channel using the same method.

Figure 4:
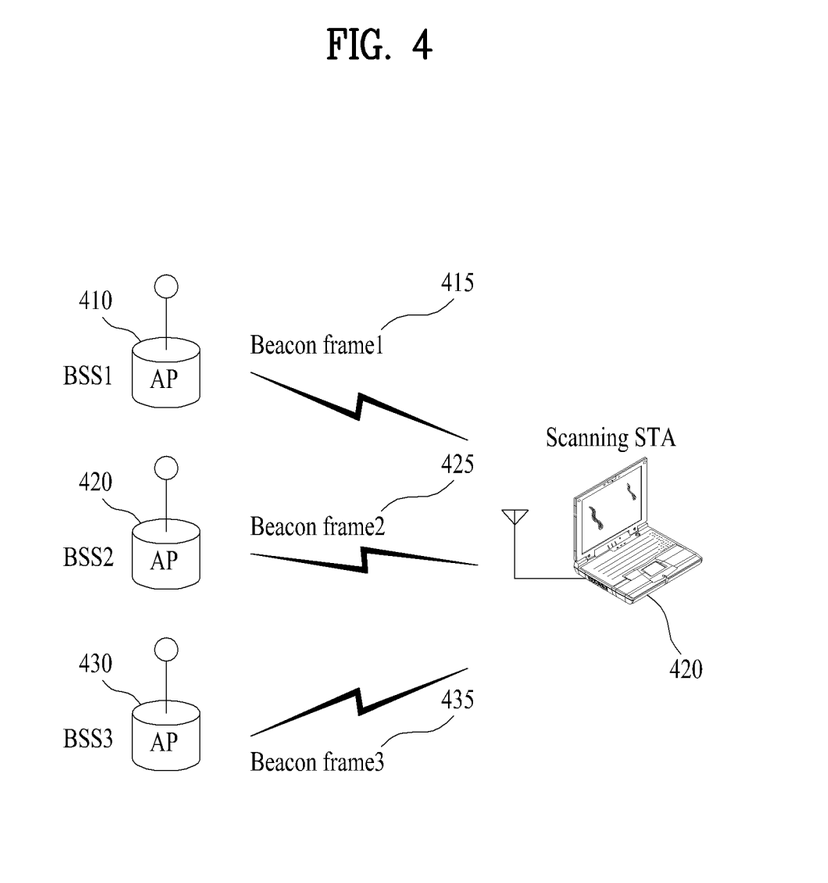
FIG. 4 schematically illustrates passive scanning.

FIG. 4 schematically illustrates passive scanning.

When an STA performs scanning using the passive scanning scheme, the STA awaits a beacon frame while switching between channels. The beacon frame, which is one of the management frames in IEEE 802.11, indicates presence of a wireless network and is transmitted at regular intervals to allow an STA which performs scanning to locate a wireless network to participate in the wireless network. In the infrastructure BSS, the AP serves to transmit the beacon frame at regular intervals.

When the STA that performs scanning has received a beacon frame, the STA stores BSS related information in the beacon frame and records beacon frame information in each channel while switching between channels.

In the example of FIG. 4, when a scanning STA 500, which is performing scanning using the passive scanning scheme, has received beacon frame 1 (415) transmitted by AP1 (410) of BSS1 and beacon frame 2 (425) transmitted by AP2 of BSS2 and has not received beacon frame 3 (435) transmitted by AP3 (430) of BSS3, the scanning STA 500 stores information indicating that the two BSSs (BSS1 and BSS2) have been found in the measurement channel and shifts to another channel.

Compared to passive scanning, active scanning has an advantage in that delay and power consumption are low.

A TV channel bandwidth in a TV Whitespace (TVWS) is 6 MHz. While the channel bandwidth at 2.4 GHz or 5 GHz is 20 MHz, the TV channel bandwidth of the TVWS is 6 MHz. Therefore, the total number of channels that each STA needs to scan is greater than that of 2.4 GHz or 5 GHz. Accordingly, in the TVWS, there is a problem in that overhead due to sensing is very high if the STA performs sensing on all channels in the scanning procedure.

Thus, in the TVWS, it is possible to reduce scanning overhead if the STA receives data indicating whether or not each TV channel is occupied by a licensed device signal from the enabling STA or the AP. That is, the enabling STA or the AP may transmit information regarding available channels, which are channels that can be used by an unlicensed device since the channels are not used by a licensed device, to the STA. The enabling STA or the AP may also transmit information regarding a maximum transmit power, which is permitted in each available channel, to the STA together with the available channel information.

Next, a method for receiving available channel information according to a first embodiment of the present invention is described below with reference to the drawings.

In the first embodiment of the present invention, the enabling STA or the AP may transmit information regarding available channels in the form of a whitespace map.

In the TVWS, the data indicating whether or not each TV channel is occupied by a licensed device signal is referred to as a whitespace map. The whitespace map may include information regarding channels in which no licensed device signal is transmitted and a transmit power level of each of the channels in which no licensed device signal is transmitted. The whitespace map may include information regarding channels in which a licensed device signal is transmitted.

The whitespace map according to an embodiment of the present invention includes a field indicating whether the whitespace map includes a white list or a black list and includes the white list or the black list according to the field. The white list is a list of channels that can be used by an unlicensed device since the channels are not used by any licensed device. Channels which can be used by an unlicensed device since the channels are not used by a licensed device signal are referred to as available channels. The black list is a list of channels that cannot be used by an unlicensed device since the channels are being used by licensed devices.

The first embodiment of the present invention suggests a method of transmitting a whitespace map using a country information element defined in the existing standard. The country information element has been introduced to satisfy a rule that the transmit power level of a specific band differs for each sub-band. The country information element has then been extended to reflect the rules of each country.

Figure 5:
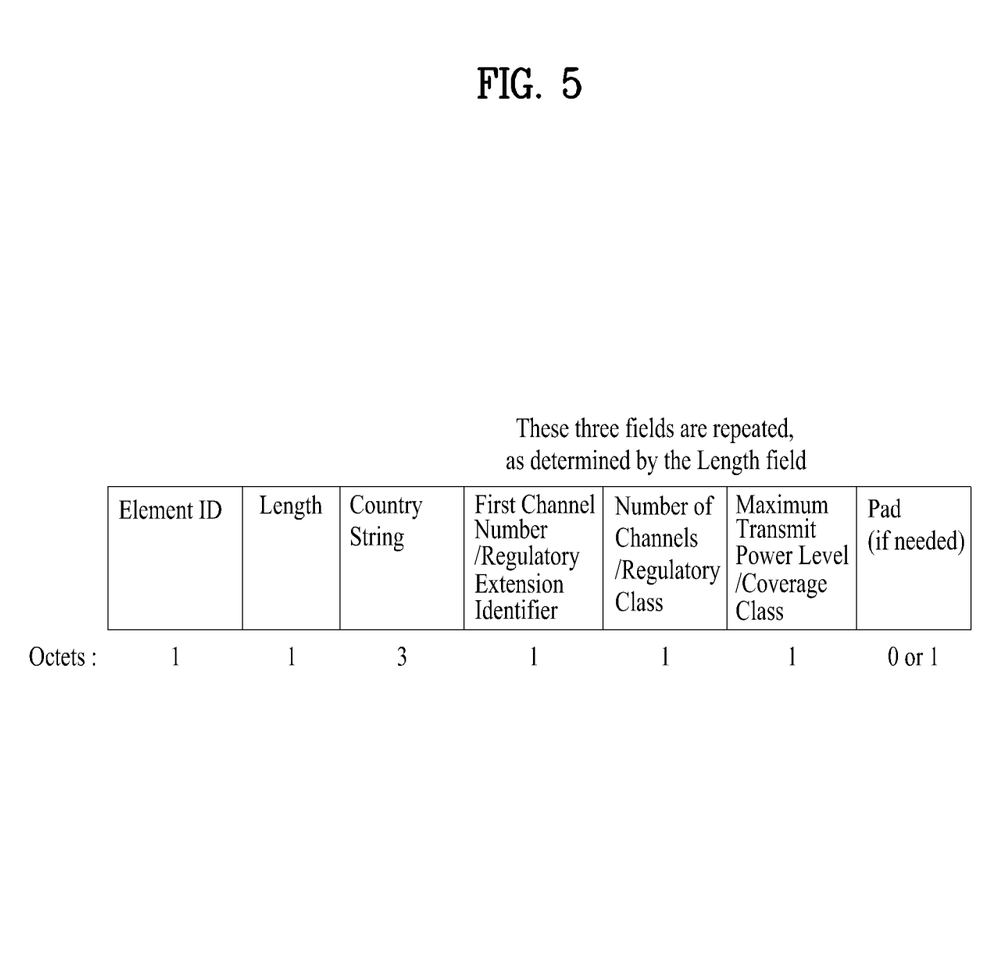
FIG. 5 illustrates a country information element.

Country information element indicating channels which are based on the operating frequencies and locations (countries) of APs and STAs are defined in the IEEE 802.11 WLAN standard. FIG. 5 illustrates a country information element. The country information element is transmitted within a beacon frame or a probe response frame.

As shown in FIG. 5, the country information element includes a First Channel Number field, a Number of Channels field, and a Maximum Transmit Power Level field. The First Channel Number field indicates a first channel number of a sub-band indicated by the country information element and the First Channel Number field and the Number of Channels field indicate, in combination, a set of channels in which the AP operates. The Maximum Transmit Power Level field indicates a maximum transmit power of a set of channels indicated by the First Channel Number field and the Number of Channels field.

The First Channel Number field, the Number of Channels field, and the Maximum Transmit Power Level field are defined as a sub-band triplet that indicates information regarding the sub-band and a plurality of sub-band triplets may be included in the country information element. That is, a sub-band transmits information regarding a channel in which the corresponding AP can operate.

As shown in FIG. 5, the First Channel Number field, the Number of Channels field, and the Maximum Transmit Power Level field may indicate respective values of a regulatory extension identifier, a regulatory class, and a coverage class. In this case, the First Channel Number field, the Number of Channels field, and the Maximum Transmit Power Level field are defined as a set of regulatory triplets. A regulatory triplet may be followed by a sub-band triplet.

In the case in which the regulatory class of the country information element is set to a value corresponding to the TVWS as a method of transmitting the whitespace map using the country information element, the sub-band triplet which follows the regulatory class may be defined to indicate the white list or the black list. When the STA has received the whitespace map through the country information element, the STA performs scanning using the white list or the black list included in the country information element. That is, the STA scans only channels included in the white list when the country information element includes the white list and scans channels other than the channels included in the black list when the country information element includes the black list.

Here, information indicating whether the channel list indicated by the sub-band triplet of the country information element is a white list or a black list needs to be provided. Accordingly, when the Maximum Transmit Power Level field is set to a predefined specific value (for example, 0 or infinite), this may be defined to indicate that the channel list indicated by the sub-band triplet of the country information element is a black list. That is, when the sub-band triplet of the country information element includes a white list, the Maximum Transmit Power Level field may indicate the maximum transmit power levels of channels indicated by the sub-band triplet of the country information element and, when the sub-band triplet of the country information element includes a black list, the Maximum Transmit Power Level field may be set to the specific value such as 0 or infinite to indicate that the channel list indicated by the sub-band triplet of the country information element is the black list.

When the STA has received the country information element, the STA determines that the channel list indicated by the sub-band triplet of the country information element is a black list when the Maximum Transmit Power Level field is set to the predefined specific value and then performs scanning on channels other than channels included in the channel list indicated by the sub-band triplet.

Figure 6:
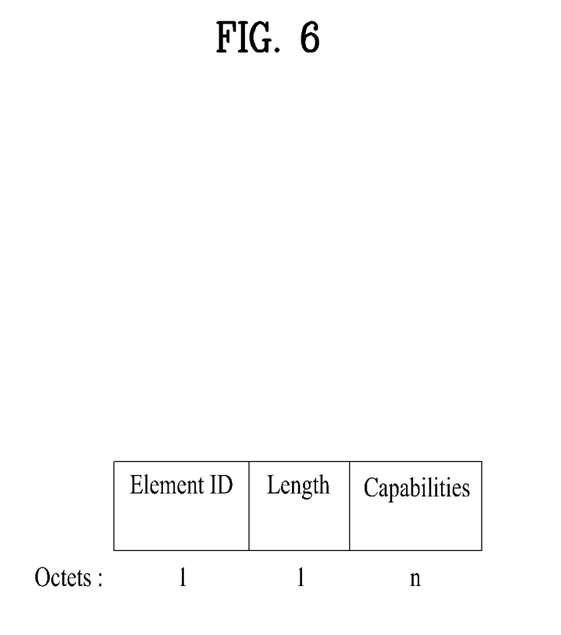
FIG. 6 illustrates an extended capabilities information element.

As another method of transmitting the whitespace map using the country information element, the present invention suggests a method of transmitting the whitespace map using an extended capabilities information element. FIG. 6 illustrates the extended capabilities information element.

A whitespace map service bit may be defined in a capabilities field of the extended capabilities information element and the whitespace map service bit may be set to a predefined value to indicate that the country information element includes a black list or a white list. That is, when a whitespace map service bit of a capabilities field of a received extended capabilities information element is set to the predefined value, the STA determines that the country information element includes a black list or a white list.

A whitespace map service bit is added to the capabilities field of the extended capabilities information element and, when the whitespace map service bit is true (for example, 1), a sub-band triplet that follows the regulatory triplet indicates a white list or a black list. When the STA has received a country information element including a white list or a black list, the STA performs scanning taking into consideration the white list or the black list of the country information element. That is, the STA scans channels included in a white list when the country information element includes the white list and scans channels other than channels of the TVWS included in a black list when the country information element includes the black list.

When the STA has transmitted, to the AP, an extended capabilities information element including a whitespace map service bit which is set to true, the AP may determine that the STA has requested a whitespace map and transmit the whitespace map to the STA using the country information element.

Although the first embodiment of the present invention has been described above with reference to an example in which a whitespace map service bit is added to the extended capabilities information element, the whitespace map service bit may be included in any information element or any frame.

Next, a method for receiving available channel information according to a second embodiment of the present invention is described below with reference to FIGS. 7 to 9.

A frame including available channel information according to the second embodiment of the present invention may include an Operating Class field, a Channel Number field, and a maximum transmit power field.

The operating class is a predefined index of a set of values for wireless operation in a regulatory domain. The operating class and the channel number may indicate, in combination, one channel.

Accordingly, the Operating Class field and the Channel Number field included in the frame including the available channel information according to the second embodiment indicate, in combination, one available channel. The maximum transmit power field indicates a maximum transmit power that is permitted in the available channel indicated by the Operating Class field and the Channel Number field. When an available channel is signaled, the maximum transmit power that is permitted in the available channel is also signaled since the maximum transmit power permitted in the channel varies according to whether a licensed device signal is present in an adjacent channel.

First, an exemplary information element (IE) including available channel information according to the second embodiment of the present invention is described below with reference to FIG. 7. FIG. 7 illustrates an exemplary information element including available channel information according to the second embodiment of the present invention. The information element shown in FIG. 7 may also be referred to as a channel power management announcement element.

The channel power management announcement element may be transmitted by an AP in a BSS and may be transmitted by an STA in an IBSS. The channel power management announcement element may be transmitted when channel availability has changed, when a BBS has moved to a new channel, or when the maximum transmit power has changed.

Figure 7:
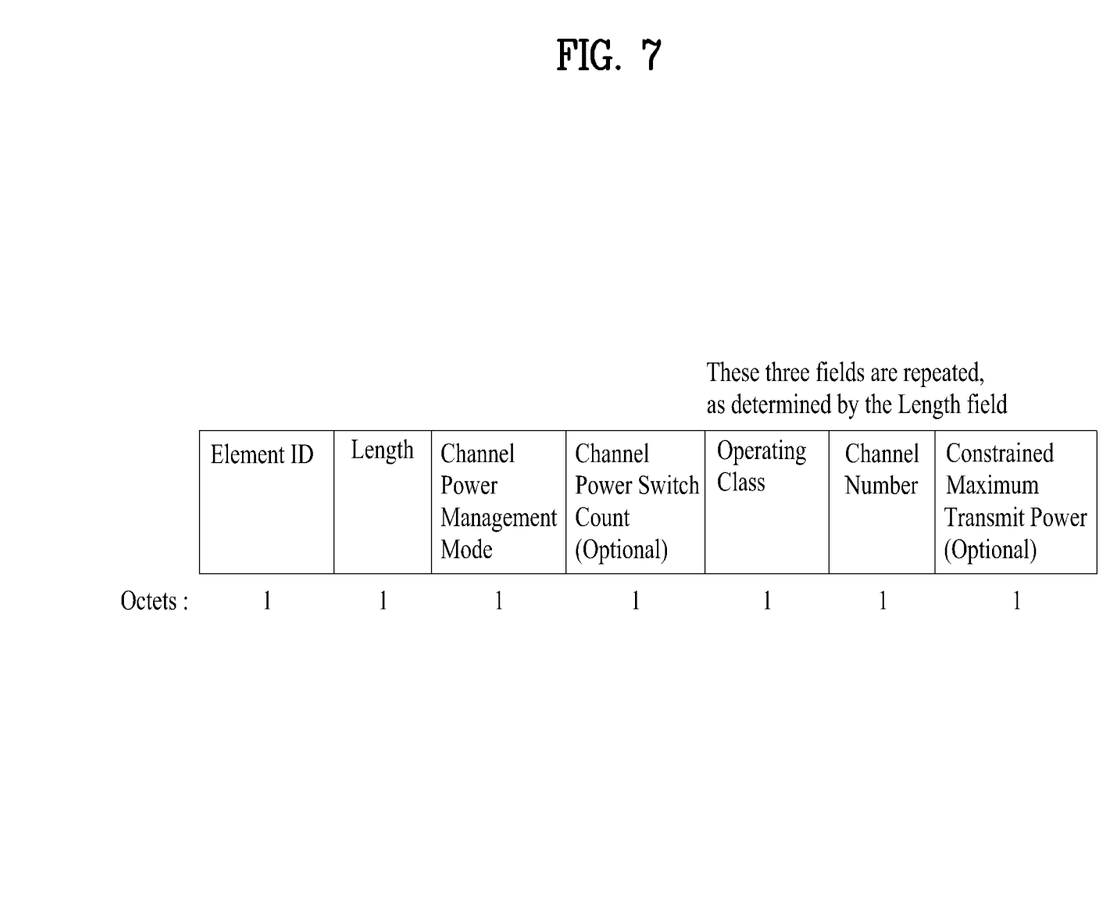
FIG. 7 illustrates an exemplary information element including available channel information according to a second embodiment of the present invention.

As shown in FIG. 7, the channel power management announcement element includes an Element ID field, a Length field, a Channel Power Management Mode field, a Channel Power Switch Count field, an Operating Class field, a Channel Number field, and a Constrained Maximum Transmit Power field.

The Element ID field indicates that the corresponding element is a channel power management announcement element and the Length field indicates the length of fields that follow the Length field.

The Channel Power Management Mode field indicates whether or not the channel power management announcement element includes a Channel Power Switch Count field and whether or not the channel power management announcement element includes a Constrained Maximum Transmit Power field. In addition, the Channel Power Management Mode field indicates whether the channel power management announcement element indicates that the available channel list has changed, that channel switching has been made to a new channel, or that the maximum transmit power has changed. Alternatively, the Channel Power Management Mode field may indicate limitation of transmission.

For example, when the Channel Power Management Mode field is set to 0, this may indicate that the channel power management announcement element is used to indicate that a new channel has been added to the available channel list. In this case, the channel power management announcement element may not include a Channel Power Switch Count field but instead may include an Operating Class field, a Channel Number field, and a Constrained Maximum Transmit Power field.

When the Channel Power Management Mode field is set to 1, this may indicate that the channel power management announcement element is used to indicate that a channel has been removed from the available channel list. In this case, the channel power management announcement element may not include a Channel Power Switch Count field and a Constrained Maximum Transmit Power field but instead may include an Operating Class field and a Channel Number field.

When the Channel Power Management Mode field is set to 2 or 3, this may indicate that the channel power management announcement element is used to indicate that a maximum transmit power of a specific channel has changed. In this case, the channel power management announcement element includes a Channel Power Switch Count field, a Constrained Maximum Transmit Power field, an Operating Class field, and a Channel Number field.

When the Channel Power Management Mode field is set to 4 or 5, this may indicate that the channel power management announcement element is used to indicate channel shift. In this case, the channel power management announcement element includes a Channel Power Switch Count field, a Constrained Maximum Transmit Power field, an Operating Class field, and a Channel Number field.

The Channel Power Switch Count field indicates the number of target beacon transmission times (TBTTs) that have passed until an STA which has transmitted the channel power management announcement element shifts to a new channel. The Channel Power Switch Count field may also be set to 0. The Channel Power Switch Count field may be set to 0 when the channel power management announcement element is used to indicate that the maximum transmit power has changed without channel shift.

The Operating Class field indicates an operating class of a target channel of the channel power management announcement element. The Operating Class field indicates an operating class of a new channel added to the available channel list when the channel power management announcement element is transmitted in order to indicate that the new channel has been added to the available channel list. The Operating Class field indicates an operating class of a specific channel removed from the available channel list when the channel power management announcement element is transmitted in order to indicate that the specific channel has been removed from the available channel list.

The Channel Number field indicates a channel number of a target channel of the channel power management announcement element. The Operating Class field indicates a channel number of a new channel added to the available channel list when the channel power management announcement element is transmitted in order to indicate that the new channel has been added to the available channel list. The Operating Class field indicates a channel number of a specific channel removed from the available channel list when the channel power management announcement element is transmitted in order to indicate that the specific channel has been removed from the available channel list.

Thus, the Operating Class field and the Channel Number field indicate, in combination, one channel. That is, the Operating Class field and the Channel Number field indicate, in combination, a new channel added to the available channel list when the channel power management announcement element is transmitted in order to indicate that the new channel has been added to the available channel list and indicate, in combination, a specific channel removed from the available channel list when the channel power management announcement element is transmitted in order to indicate that the specific channel has been removed from the available channel list. One channel, which the Operating Class field and the Channel Number field indicate in combination, may be a wireless LAN channel.

The Constrained Maximum Transmit Power field indicates a maximum transmit power that is permitted in a channel indicated by the Operating Class field and the Channel Number field.

As shown in FIG. 7, the channel power management announcement element may include a plurality of sets of an Operating Class field, a Channel Number field, and a Constrained Maximum Transmit Power field.

Next, an exemplary frame including available channel information according to the second embodiment of the present invention is described below with reference to FIGS. 8 and 9. FIG. 8 illustrates an exemplary frame including available channel information according to the second embodiment of the present invention and FIG. 9 illustrates a format of a Channel List field.

Figure 8:
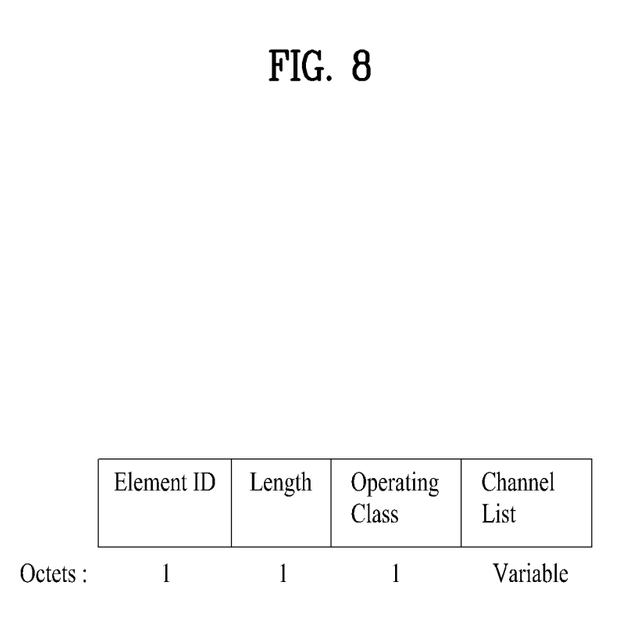
FIG. 8 illustrates an exemplary frame including available channel information according to the second embodiment of the present invention.
Figure 9:
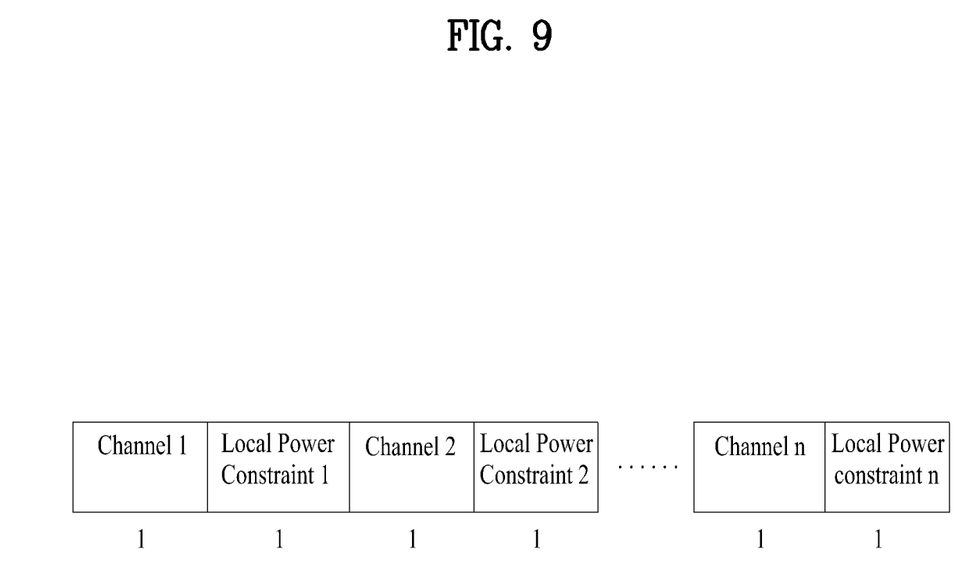
FIG. 9 illustrates a format of a Channel List field.

The frame shown in FIGS. 8 and 9 may be considered a form of an AP Channel Report frame defined in IEEE 802.11k which has been changed to suit the characteristics of available channel information. FIG. 8 illustrates a format of the AP channel report frame. Here, the second embodiment of the present invention suggests a method for modifying the Channel List field into the format as shown in FIG. 9.

As shown in FIG. 8, a frame including available channel information according to the second embodiment may include an Element ID field, a Length field, an Operating Class field, and a Channel List field.

The Element ID field indicates that the corresponding element is an AP channel report frame and the Length field indicates the length of fields that follow the Length field.

The Operating Class field indicates an operating class of an available channel.

As shown in FIG. 9, the Channel List field includes a Channel field and a Local Power Constraint field.

The Channel field indicates a channel number of an available channel. That is, the Operating Class field and the Channel field indicate, in combination, an available channel.

The Local Power Constraint field indicates a maximum transmit power that is permitted in a channel indicated by the Operating Class field and the Channel Number field.

As shown in FIG. 8, one AP channel report frame can express only one operating class. Here, a plurality of AP channel report frames may be transmitted. Alternatively, one AP channel report frame may include a plurality of operating classes.

When the STA has received the frame shown in FIGS. 8 and 9, the STA may perform scanning using available channel information included in the received frame. That is, the STA can reduce scanning time by scanning only available channels included in the received frame.

For backward compatibility, it may be agreed between the AP and the STA that the Channel List field is in the format as shown in FIG. 9 only when the value of the Operating Class field indicates an operating class corresponding to the TVWS.

Alternatively, a Whitespace Map Service bit may be defined in the Capabilities field of the extended capabilities information element such that the Whitespace Map Service bit may be set to a predefined value to notify the STA that the Channel List field of the AP channel report frame is in the format as shown in FIG. 9. That is, when a Whitespace Map Service bit in a Capabilities field of a received extended capabilities information element is set to the predefined value, the STA determines that the Channel List field of the AP channel report frame is in the format as shown in FIG. 9.

Specifically, a Whitespace Map Service bit is added to a Capabilities field of an extended capabilities information element and, when the added Whitespace Map Service bit is true (for example, 1), the AP channel report frame includes an available channel list and the Channel List field of the AP channel report frame is in the format as shown in FIG. 9.

On the other hand, when the Whitespace Map Service bit is not true, the Channel List field includes only a channel number as in the conventionally defined format.

Figure 10:
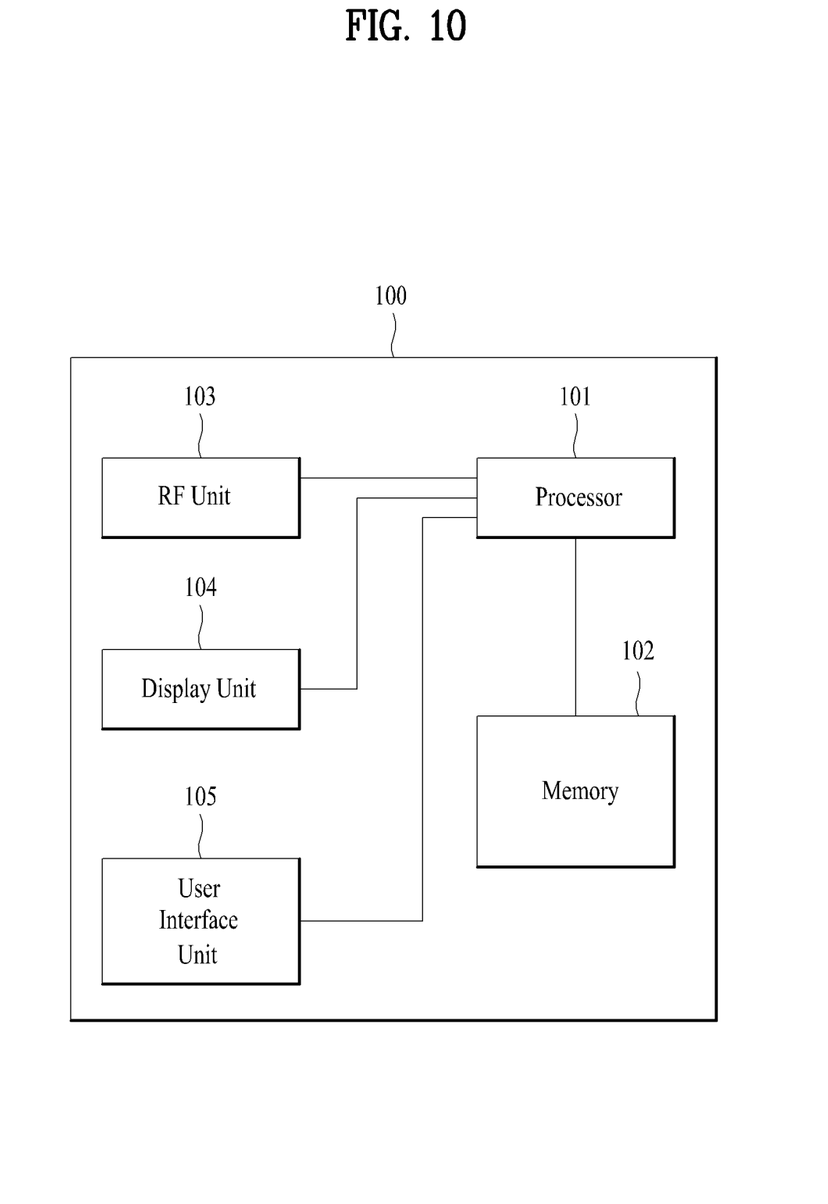
FIG. 10 is a block diagram illustrating a configuration of a device which can be applied to an STA or an AP and which can carry out the present invention.

FIG. 10 is a block diagram illustrating a configuration of a device which can be applied to an STA or an AP and which can carry out the present invention. As shown in FIG. 10, the device 100 includes a processor 101, a memory 102, a Radio Frequency (RF) unit 103, a display unit 104, and a user interface unit 105.

A physical interface protocol layer is implemented in the processor 101. The processor 101 provides a control plane and a user plane. Functions of each layer can be performed by the processor 101.

The memory 102 is electrically connected to the processor 101 and stores an operating system, applications, and general files.

When the device 600 is a user equipment, the display unit 104 may display various information and may be implemented using a known Liquid Crystal Display (LCD), a known Organic Light Emitting Diode (OLED), or the like. The user interface unit 105 may be coupled to a known user interface such as a keypad or a touchscreen.

The RF unit 103 is electrically connected to the processor 101 and transmits or receives a wireless signal. The RF unit 103 may include a transmission module and a reception module.

The transmission module may perform specific coding and modulation on a signal and/or data, which is scheduled to be transmitted to the outside by the processor 101, and then may deliver the signal and/or data to an antenna.

The reception module may perform decoding and demodulation on a wireless signal, which is received from the outside through an antenna, to reconstruct the wireless signal into original data and then may deliver the reconstructed data to the processor 101.

The reception module according to an embodiment of the present invention receives a frame including an Operating class field, a Channel Number field, and a maximum transmit power field from the AP or enabling STA. Here, the Operating Class field and the Channel Number field indicate an available channel that can be used by an unlicensed device and the maximum transmit power field indicate a maximum transmit power that is permitted in the available channel.

The processor according to an embodiment of the present invention operates in a channel indicated by an Operating Class field and a Channel Number field included in a frame received from the AP or the enabling STA.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the various embodiments of the present invention have been described above mainly with reference to an IEEE 802.11 system, the present invention may be applied in the same manner to various mobile communication systems in which an unlicensed device can operate by acquiring available channel information.

The invention claimed is:

1. A method for receiving available channel information by a first station (STA) that operates as an unlicensed device that is allowed to operate in an available channel that is not being used by a licensed device in a whitespace band in a wireless LAN system, the method comprising:
   transmitting, by the first station to a second station, a request frame; and
   receiving a response frame, including at least one triplet, the at least one triplet including an operating class field that indicates a set of channels, a channel number field, and a maximum transmit power field, from a second station,
   wherein the operating class field and the channel number field together specify at least one channel on which the first station is allowed to operate based on a maximum allowable transmission power indicated by the maximum transmit power field.

2. The method according to claim 1, wherein the response frame is received by the first station in response to the request frame when available channel list is updated.

3. The method according to claim 1, wherein the triplet is a set of three field, each of three fields has one octet length.

4. A first station (STA) that operates as an unlicensed device that is allowed to operate in an available channel that is not being used by a licensed device in a whitespace band in a wireless LAN system, the first station comprising:
   an RF (radio frequency) unit; and
   a processor configured to:
      transmit a request frame; and
      receive a response frame including at least one triplet, the at least one triplet including, from a second station:
         an operating class field that indicates a set of channels;

a channel number field; and a maximum transmit power field, wherein the operating class field and the channel number field together specify at least one channel on which the first station is allowed to operate based on a maximum allowable transmission power indicated by the maximum transmit power field.

5. The first station according to claim 4, wherein the response frame is received by the first station in response to the request frame when available channel list is updated.

6. The first station according to claim 4, wherein the triplet is a set of three field, each of three fields has one octet length.

* * * * *